(12) United States Patent
Barth et al.

(10) Patent No.: US 10,170,995 B2
(45) Date of Patent: Jan. 1, 2019

(54) MULTIPHASE POWER CONVERTER

(71) Applicant: Dialog Semiconductor (UK) Limited, London (GB)

(72) Inventors: Carsten Barth, Stuttgart (DE); Jens Masuch, Munich (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/647,320

(22) Filed: Jul. 12, 2017

(65) Prior Publication Data

US 2018/0054124 A1 Feb. 22, 2018

(30) Foreign Application Priority Data

Aug. 19, 2016 (DE) .......................... 10 2016 215 606

(51) Int. Cl.
| | | |
|---|---|---|
| *H02M 3/158* | (2006.01) | |
| *G05F 1/40* | (2006.01) | |
| *H02M 5/27* | (2006.01) | |
| *H02M 5/458* | (2006.01) | |
| *H02M 7/483* | (2007.01) | |
| *H02M 1/00* | (2006.01) | |

(52) U.S. Cl.
CPC ............ *H02M 3/1584* (2013.01); *G05F 1/40* (2013.01); *H02M 5/271* (2013.01); *H02M 5/458* (2013.01); *H02M 7/483* (2013.01); *H02M 2001/0032* (2013.01); *H02M 2003/1586* (2013.01)

(58) Field of Classification Search
CPC .... H02M 3/158; H02M 3/157; H02M 3/1584; H02M 5/453; H02M 5/458; H02M 7/483; G05F 1/10; G05F 1/12; G05F 1/40; G05F 1/44; G05F 1/59

USPC ................................. 323/265, 268, 271, 272
See application file for complete search history.

(56) References Cited

U.S. PATENT DOCUMENTS 6,441,597 B1 * 8/2002 Lethellier ............. H02M 3/158
323/222
9,654,007 B1 * 5/2017 Childs ................. H02M 3/1582
(Continued)

OTHER PUBLICATIONS

German Office Action, File No. 10 2016 215 606.3, Applicant: Dialog Semiconductor (UK) Limited, dated Apr. 12, 2017, 5 pgs., and English language translation, 4 pgs.

*Primary Examiner* — Adolf Berhane
(74) *Attorney, Agent, or Firm* — Saile Ackerman LLC; Stephen B. Ackerman

(57) ABSTRACT

A multiphase power converter and a corresponding method is presented. The multiphase power converter contains a first and a second constituent switched-mode power converter. The first constituent switched-mode power converter provides, both in a first mode of operation and in a second mode of operation, a first phase current to an output of the converter. The second constituent switched-mode power converter provides, in the second mode, a second phase current to the output of the converter. The converter switches, depending on an operation condition of the converter, between the first mode and the second mode. A first transconductance of the first constituent switched-mode power converter is adapted when switching between the first mode and the second mode. By adapting the first transconductance, unsteadiness of the output voltage of the converter occurring during the switching between both modes of operation is minimized.

19 Claims, 5 Drawing Sheets

(56) References Cited

U.S. PATENT DOCUMENTS

| | | | |
|---|---|---|---|
| 9,742,280 B2* | 8/2017 | Childs | H02M 1/08 |
| 9,837,906 B1* | 12/2017 | Childs | H02M 3/1582 |
| 2002/0135338 A1 | 9/2002 | Hobrecht et al. | |
| 2005/0035746 A1 | 2/2005 | Bemacchia et al. | |
| 2010/0013305 A1 | 1/2010 | Heineman | |
| 2010/0164454 A1* | 7/2010 | Rinne | H02M 3/1584 |
| | | | 323/282 |
| 2011/0012687 A1* | 1/2011 | Effler | H02M 3/157 |
| | | | 332/110 |
| 2015/0288285 A1* | 10/2015 | Paul | H02M 3/158 |
| | | | 323/271 |
| 2017/0324332 A1* | 11/2017 | Molari | H02M 3/1584 |
| 2018/0013348 A1* | 1/2018 | Paul | H02M 3/158 |

* cited by examiner

MULTIPHASE POWER CONVERTER

TECHNICAL FIELD

The present document relates to a multiphase power converter comprising at least a first and a second switched-mode power converter. More specifically, the document relates to a multiphase power converter configured to enable the first and/or the second switched-mode power converter depending on the overall load current.

BACKGROUND

In mobile systems, the total load current a power converter is required to supply is increasing continuously. However, due to form factor constraints, the physical size of the inductor packages is restricted. As a consequence, the maximum current each inductor is able to supply is limited, too.

SUMMARY

In order to overcome said current limits, multiphase power converters such as e.g. multiphase buck architectures are applied, wherein the total load current is supplied by multiple inductors arranged in parallel. It is beneficial in terms of output voltage ripple and loop dynamics if these inductors are phased in a well-controlled sequential fashion. This technique is known as multiphase scheme.

As the number of phases used in a power converter increases, it becomes more beneficial to use more combinations of different phases. For example, at low load currents, the power converter may use only a single (high-efficiency) phase. At higher currents, however, more phases may be enabled to switch until, at the maximum load current, all phases are enabled. In this way, the performance of the power converter is adjusted dependent on the desired load current over a large range of load currents.

According to an aspect, a multiphase power converter comprising at least a first and a second constituent switched-mode power converter is presented. The first constituent switched-mode power converter is configured to provide, both in a first mode of operation and in a second mode of operation, a first phase current to an output of the multiphase power converter. The second constituent switched-mode power converter is configured to provide, in the second mode of operation, a second phase current to the output of the multiphase power converter. To be more specific, the second phase current is only provided to the output of the multiphase power converter in the second mode of operation and not in the first mode of operation. The multiphase power converter is configured to switch, depending on an operation condition of the multiphase power converter, between the first mode of operation and the second mode of operation. At this, the operation condition may be e.g. a load current at the output of the multiphase power converter. At low load currents, for example, only the first constituent switched-mode power converter may be active, thereby avoiding switching losses that would occur in the second constituent switched-mode power converter. At high load currents, on the other hand, both switched-mode power converters may be actively supplying first and the second phase currents to the output of the multiphase power converter.

The first constituent switched-mode power converter comprises a first inductor, and the second constituent switched-mode power converter comprises a second inductor. It is not necessary that the first inductor has the same value as the second inductor. Rather, different inductor values may be used dependent on the requirements of the application. For instance, the first inductor may be chosen to have a higher value to achieve high static efficiency at low load currents, whereas the second inductor may be chosen to have a lower value to enable a fast load transient response and a higher saturation current.

At least one of the constituent switched-mode power converters may be a buck converter, a boost converter or a buck-boost converter. The constituent switched-mode power converters may be operated in current mode control. In current mode control, the inductor current is directly regulated as a function of error voltage. All constituent switched-mode power converters may be conventional buck converters which operate in discontinuous conduction mode DCM or continuous conduction mode CCM. Moreover, different current mode control loops such as peak, valley or average current control may be used for each constituent switched-mode power converter, i.e. different control loops may be used for each phase of the multiphase power converter. For example, the first constituent switched-mode power converter may be controlled using a peak current control mode PCCM system. On the other hand, the second constituent switched-mode power converter may e.g. be controlled using a valley current control mode VCCM system.

As current mode control may regulate the output current as a function of error voltage, an effective transconductance between the phase current and the error voltage can be defined. The multiphase power converter is configured to adapt a first transconductance of the first constituent switched-mode power converter when switching between the first mode of operation and the second mode of operation. At this, the first transconductance is defined as the ratio of the first phase current at the output of the first constituent switched-mode power converter to the input control voltage applied at the input of the first constituent switched-mode power converter. Analogously, the second constituent switched-mode power converter is characterized by a second transconductance. Since the first and the second constituent switched-mode power converter form parallel branches within the multiphase power converter, the overall transconductance of the multiphase power converter is determined by the sum of the first transconductance and the second transconductance.

In other words, the multiphase power converter is configured to apply a first value of first transconductance in the first mode of operation and a second value of the first transconductance in the second mode of operation. It is assumed that the change between the first value and the second value occurs at the same point in time (i.e. simultaneously) as the switching between the first mode of operation and the second mode of operation. Alternatively, the first transconductance may be adapted at a time slightly before or after the mode of operation is switched. When the multiphase power converter operates in the first mode of operation (or in the second mode of operation, respectively), the first transconductance (or the second transconductance, respectively) may be e.g. maintained constant since there is no need for adaptation.

By adapting the first transconductance, unsteadiness of the output voltage of the multiphase power converter occurring during the switching between both modes of operation may be minimized. In particular, when switching from the first mode of operation to the second mode of operation without adaptation of the individual transconductances, the increased overall transconductance will result in an immediate jump of the output voltage of the multiphase power converter at the moment when the mode of operation is switched. Therefore, to minimize or avoid this undesired behavior, the multiphase power converter may be configured to increase the first transconductance when switching from the second mode of operation to the first mode of operation. In other words, in the first mode of operation, the multiphase power converter may be configured to operate at an increased transconductance to obtain a smooth progression of the output voltage in case an increased load current triggers switching from the first mode of operation to the second mode of operation. Moreover, it becomes possible to use tighter voltage regulation parameters for a given minimum output capacitor requirement. That is, the proposed system is advantageous for high performance multiphase power converters with tight load regulation (both static and transient) with small output capacitance requirements.

In particular, to almost completely avoid jumps of the output voltage due to mode switches, the multiphase power converter may be configured to increase the first transconductance by an amount equal to the second transconductance of the second constituent switched-mode power converter when switching from the second mode of operation to the first mode of operation. As a result, the overall transconductance of the multiphase power converter is kept constant although the multiphase power converter may switch to the first mode of operation in which the second constituent switched-mode power converter is disabled.

In general, the multiphase power converter may be configured to adapt the first transconductance of the first constituent switched-mode power converter such that the overall transconductance of the multiphase power converter is approximately the same in the first mode of operation and in the second mode of operation, wherein the overall transconductance is determined by the sum of the first transconductance and a second transconductance of the second switched-mode power converter.

The multiphase power converter may comprise a first switching unit for implementing the above described adaptation of the first transconductance. Moreover, the first constituent switched-mode power converter may comprise a first voltage controlled current source VCCS which is characterized by the first transconductance and the second constituent switched-mode power converter may comprise a second VCCS characterized by the second transconductance. The first switching unit may be configured to couple, in the first mode of operation, a terminal of the first VCCS with a terminal of the second VCCS such that both the output current of the first VCCS and the output current of the second VCCS are provided to the first inductor of the first constituent switched-mode power converter. The first switching unit may be configured to decouple said terminals in the second mode of operation.

The first switching unit be implemented with any suitable device, such as, for example, a metal-oxide-semiconductor field effect transistor (MOSFET), an IGBT, a MOS-gated thyristor, or other suitable power device. The switching unit may have a gate to which a respective driving voltage or control signal may be applied to turn the switching unit on or off. The first VCCS may comprise a transconductance amplifier. Similarly, also the second VCCS may comprise a transconductance amplifier.

With the help of a simple switching element, it becomes possible to adapt the first transconductance dependent on the present mode of operation. Specifically, by summing up the output currents of the first VCCS and the second VCCS, the overall transconductance of the multiphase converter is kept constant independent of the present mode of operation.

As already described in the forgoing, the multiphase power converter may be configured to switch to the second mode of operation when a load current at the output of the multiphase power converter exceeds a first current threshold, and configured to switch to the first mode of operation when the load current falls below a second current threshold. At this, the first current threshold is not necessarily identical to the second current threshold.

The described multiphase power converter may be extended to comprise more than 2 (e.g. 3, 4, or 5) constituent switched-mode power converters e.g. to account for higher load currents. Specifically, the multiphase power converter may comprise, in addition to the above described features, a third and a fourth constituent switched-mode power converter, a second switching unit and a third switching unit. The third constituent switched-mode power converter may comprise a third VCCS characterized by a third transconductance, and may be configured to provide, in a third mode of operation only, a third phase current to the output of the multiphase power converter. The fourth constituent switched-mode power converter may comprise a fourth VCCS characterized by a fourth transconductance, and may be configured to provide, in the third mode of operation only, a fourth phase current to the output of the multiphase power converter. Put in a different way, both the third and the fourth constituent switched-mode power converter are only enabled in the third mode of operation e.g. to enable high load currents at the output of the multiphase power converter.

Within the extended multiphase power converter, the first constituent switched-mode power converter may be configured to provide the first phase current to the output of the multiphase power converter in the first, the second and the third mode of operation. The second constituent switched-mode power converter may be configured to provide the second phase current to the output of the multiphase power converter only in the second and the third mode of operation. The multiphase power converter may be configured to switch, depending on the operation condition of the multiphase power converter, between the first, the second and the third mode of operation. The first switching unit works as described above i.e. the first switching unit establishes an electrical connection between the terminals of the first and the second VCCS in the first mode of operation and isolates the latter terminals in the second mode of operation. In addition, in the third mode of operation, the first switching unit is configured to decouple the terminals of the first and the second VCCS.

The second switching unit may be configured to couple, in the first and second mode of operation, the terminal of the first VCCS with a terminal of the third VCCS such that both the output current of the first VCCS and an output current of the third VCCS are provided to the inductor of the first constituent switched-mode power converter. Further, the second switching unit may be configured to decouple the latter terminals in the third mode of operation.

The third switching unit may be configured to couple, in the first and second mode of operation, the terminal of the second VCCS with a terminal of the fourth VCCS. Consequently, in the first mode of operation, both the output current of the second VCCS and an output current of the fourth VCCS are provided to the first inductor of the first constituent switched-mode power converter. Specifically, since in the first mode of operation the second constituent switched-mode power converter is disabled, the output current of the fourth VCCS is guided over the third switching unit and the first switching unit to the first inductor.

In the second mode of operation, both the output current of the second VCCS and the output current of the fourth VCCS are provided to the second inductor of the second constituent switched-mode power converter.

In the third mode of operation, the third switching unit may be configured to decouple the terminal of the second VCCS and the terminal of the fourth VCCS.

The extended multiphase power converter ensures a constant overall transconductance in all three modes of operation, i.e. independent of the number of enabled phases. At this, only a minimum number of 3 switching units is required to control a multiphase power converter with 4 phases. In the first mode of operation, only the first phase (i.e. the first switched-mode power converter) is enabled and all three switching units are closed. Thus, all four output currents of the VCCSs are summed up and contribute to the first phase current, resulting in an overall transconductance equal to the sum of all individual transconductances. Those skilled in the art of switched-mode power converters will readily understand that, within the first phase, the summed-up current is flowing e.g. via a high-side switch of the power stage and the first inductor to the output of the multiphase power converter.

In the second mode of operation, only the first phase and the second phase are enabled and only the second and the third switching units are closed. As a result, the combined currents of the first and the third VCCS contribute to the first phase current and the combined currents of the second and the fourth VCCS contribute to the second phase current. In total, the overall transconductance of the multiphase power converter is the sum of all individual transconductances.

Finally, in the third mode of operation, all phases are active and the switching units are open. In this scenario, the output currents of the VCCSs are separately guided towards the respective phase currents of the single phases. The four transconductances individually contribute to the overall transconductance, which is again the sum of all individual transconductances.

According to another aspect, a method for operating a multiphase power converter comprising a first and a second constituent switched-mode power converter is presented.

The method comprises providing, both in a first mode of operation and in a second mode of operation, a first phase current of the first constituent switched-mode power converter to an output of the multiphase power converter. Further, in the second mode of operation only, a second phase current of the second constituent switched-mode power converter is provided to the output of the multiphase power converter. Depending on an operation condition of the multiphase power converter, the multiphase power converter switches between the first mode of operation and the second mode of operation. The method also comprises adapting a first transconductance of the first constituent switched-mode power converter when switching between the first mode of operation and the second mode of operation.

Moreover, the first transconductance may be adapted by increasing the first transconductance when switching from the second mode of operation to the first mode of operation and decreasing the first transconductance when switching from the first mode of operation to the second mode of operation. More specifically, the first transconductance may be adapted by increasing the first transconductance by an amount equal to a second transconductance of the second constituent switched-mode power converter, and by decreasing the first transconductance by an amount equal to the second transconductance, respectively.

In case the first constituent switched-mode power converter comprises a first voltage controlled current source VCCS characterized by the first transconductance, and the second constituent switched-mode power converter comprises a second VCCS characterized by the second transconductance, the the step of adapting may further comprise connecting, in the first mode of operation, a terminal of the first VCCS with a terminal of the second VCCS such that both a current of the first VCCS and a current of the second VCCS are provided to an inductor of the first constituent switched-mode power converter. Said terminals may be disconnected in the second mode of operation.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple", "connect", "coupled" or "connected" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

Figure 1:
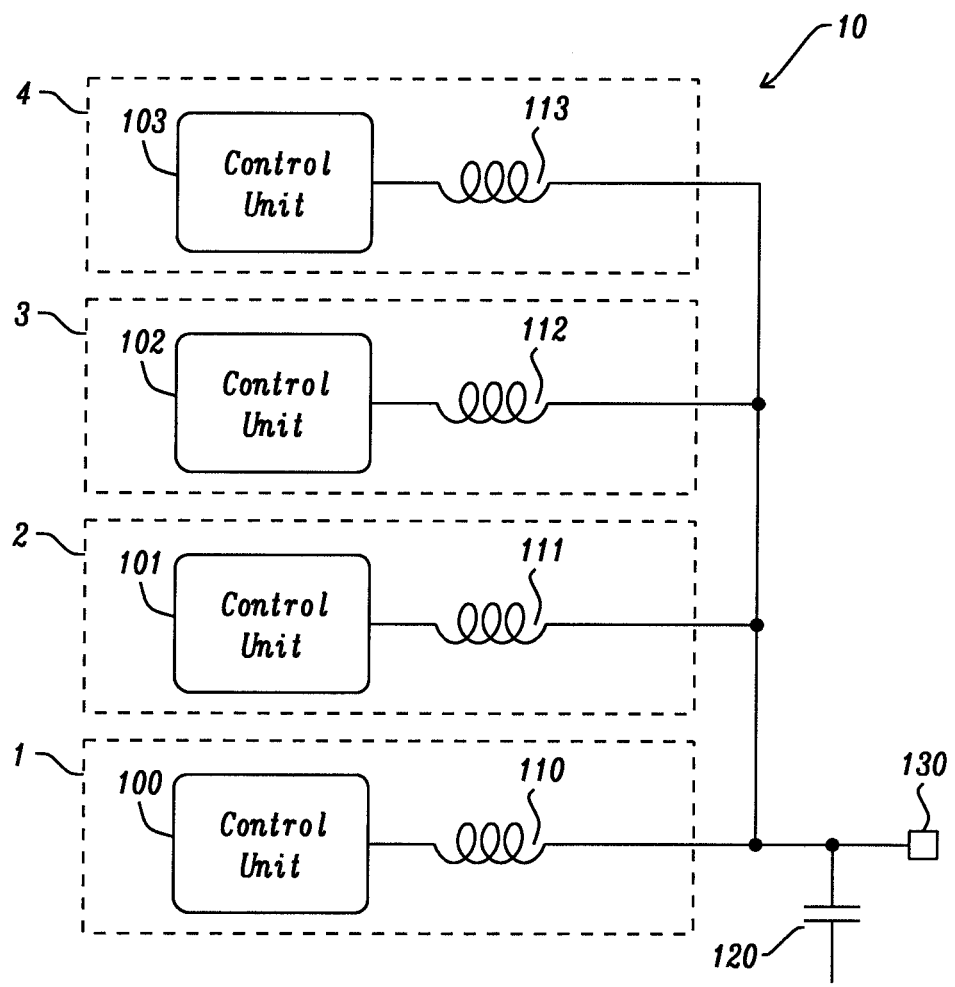
FIG. 1 shows a schematic illustration of an exemplary multiphase power converter.

As outlined above, the present document relates to a multiphase power converter comprising at least two constituent switched-mode power converters. FIG. 1 shows a schematic illustration of an exemplary multiphase power converter 10. The illustrated example comprises four constituent switched-mode power converters 1, 2, 3, 4 (also denoted as phases in the following description) which may be controlled according to the principles outlined in the previous section. The four phases are connected to a joint output capacitor 120, which forms part of an output filter in combination with the respective coils 110, 111, 112, 113 of the individual phases 1, 2, 3, 4.

As can be seen in FIG. 1, each phase comprises at least a control unit 100, 101, 102, 103 and a coil 110, 111, 112, 113. Only the first phase 1 is used to support low load currents at the output 130 of the multiphase power converter 10. For example, the first control unit 100 is configured to operate in peak mode current control, and in discontinuous conduction mode (DCM) or continuous conduction mode (CCM) as appropriate. As the load current increases, the second phase 2 is added. The second phase 2 may also be operated in peak mode current control and CCM. Finally, at high load currents, all phases are enabled, i.e. two more phases 3 and 4 are added, which may be operated e.g. in peak mode current control and CCM.

In general, it should be mentioned that each phase may be operated in an arbitrary mode, including but not limited to peak, valley or average mode current control. In addition, the corresponding switched-mode power converters 1, 2, 3, 4 may be e.g. buck converters which operate in DCM or CCM.

Figure 2:
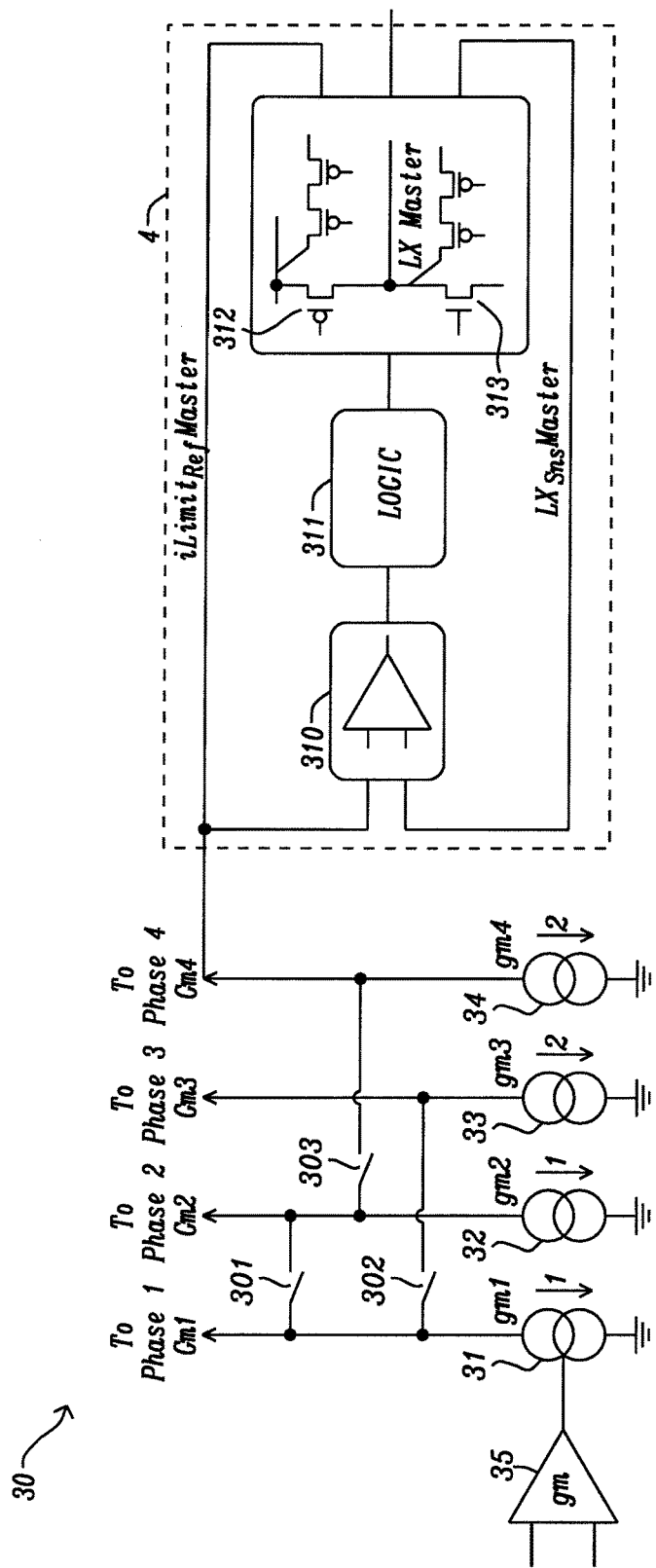
FIG. 2 shows another schematic illustration of an exemplary multiphase power converter.

FIG. 2 shows a schematic illustration of another exemplary multiphase power converter 30 in accordance with the ideas presented in this document. The depicted multiphase power converter 30 is a peak current controlled multi-phase buck converter. The peak current of each phase is controlled by a certain transconductance, which is derived by a set of four transconductance stages. The number of transconductance stages is equal to the number of phases (i.e. four in the displayed example). Throughout the description, the following definitions apply: The transconductance of each transconductance stage i.e. the transconductance of the individual VCCSs 31, 32, 33, 34 are denoted as gm1, gm2, gm3, gm4, respectively. The effective transconductance applied to each phase 1, 2, 3, 4 is denoted as Gm1, Gm2, Gm3 and Gm4, respectively. The overall transconductance of the buck converter 30 is denoted as Gm_total.

An operational amplifier 35 forms a voltage controlled current sources (VCCS) in combination with one of the current sources 31, 32, 33, and 34. Such an arrangement may be implemented e.g. with the help of four transconductance amplifiers. Alternatively, as depicted in FIG. 2, only one transconductance amplifier 35, 31 may be used in combination with 3 current mirrors 32, 33, and 34. At one input of operational amplifier 35, a reference voltage may be applied. The actual output voltage at the output 130 is feedback and applied to the other input of operational amplifier 35. Hence, operational amplifier 35 may be regarded as error amplifier within a voltage control loop of the buck converter 30.

The four VCCSs 31, 32, 33, 34 are coupled between ground and one of the phases 1, 2, 3, 4 of buck converter 30. Although FIG. 2 only displays a single phase 4, it is clear that each VCCS 31, 32, 33, 34 in FIG. 2 is coupled between ground and one phase 1, 2, 3, 4 of the buck converter 30 (see e.g. FIG. 1). Phase 4 comprises at least a high-side switching element 312 and a low side-switching element 313, and an inner current control loop comprising a current sense amplifier 310 and further control logic 311. The peak/average/valley currents of the inner control loop may be adjusted with the output currents provided by the VCCSs 31, 32, 33, and 34.

In the illustrated example circuit in FIG. 2, the transconductance of the first VCCS 31 and the second VCCS 32 are equal to a base unit gm i.e. gm2=gm1=1×gm.

The transconductance of the third VCCS 33 and the fourth VCCS 34 are double the base unit gm, i.e. gm3=gm4=2×gm. It should be mentioned that this assignment of transconductance values is chosen arbitrarily and is not meant to limit the scope of protection. In particular, the ratios of the individual transconductances is not limited to integer values.

The exemplary buck converter 30 displayed in FIG. 2 can be operated with phase 1 enabled only (first mode of operation), phase 1 and 2 enabled (second mode of operation), or all four phases enabled (third mode of operation). To achieve a constant total buck transconductance Gm_total—independent of the number of phases enabled—the output currents of the transconductance stages are summed up with the help of three switching units 301, 302, 303. In particular, the output currents of the four VCCSs 31, 32, 33, 34 are redirected by the switching units 301, 302, 303 such that the output currents associated with disabled/inactive phases are redirected to enabled/active phases to keep the overall transconductance Gm_total constant (or nearly constant), independent of the number of active phases.

As depicted in FIG. 2, the first switching unit 301 couples, in the first mode of operation, a terminal of the first VCCS 31 with a terminal of the second VCCS 32 such that both an output current of the first VCCS 31 and an output current of the second VCCS 32 are provided to an inductor 110 of the first phase 1. The first switching unit 301 decouples said terminals in the second mode of operation and in the third mode of operation.

Next, the second switching unit 302 couples, in the first and second mode of operation, said terminal of the first VCCS 31 with a terminal of the third VCCS 33 such that both the output current of the first VCCS 31 and an output current of the third VCCS 33 are provided to the inductor 110 of the first phase 1, and decouples said terminals in the third mode of operation.

Last but not least, it is the duty of the third switching unit 303 to couple, in the first and second mode of operation, said terminal of the second VCCS 32 with a terminal of the fourth VCCS 34. Consequently, both the output current of the second VCCS 32 and an output current of the fourth VCCS 34 are provided to the inductor 110 of the first phase 1 in the first mode of operation. In the second mode of operation, however, both the output current of the second VCCS 32 and the output current of the fourth VCCS 34 are provided via the third switching unit 303 and via the first switching unit 301 to the inductor 111 of the active second phase 2.

When all four phases are enabled in the third mode of operation, phase 1 is simply controlled by gm1, phase 2 by gm2, phase 3 by gm3, and phase 4 by gm4. As all switching units 301, 302, 303 are open, the effective transconductances Gm1=gm1, Gm2=gm2, Gm3=gm3, and Gm4=gm4 are directly applied to the respective phases 1, 2, 3, 4. Thus, the overall transconductance Gm_total is equal to the sum of transconductances of the individual phases, Gm_total=gm1+gm2+gm3+gm4=6×gm. When only phase 1 is enabled in the first mode of operation, the output current of all 4 transconductance stages are summed and applied to phase 1. Thus, Gm1=gm1+gm2+gm3+gm4=6×gm. Again, in this case, the overall transconductance remains the same, i.e. Gm_total=Gm1=6×gm. When only phase 1 and phase 2 are enabled in the second mode of operation, Gm1=gm1+gm3 and Gm2=gm2+gm4. Again, in this case, the total transconductance remains the same, i.e. Gm_total=Gm1+Gm2=6×gm.

Hence, the overall transconductance Gm_total of the buck converter 30 controlled by switching units 301, 302, 303 is always the same, independent of how many phases are enabled.

Figure 5:
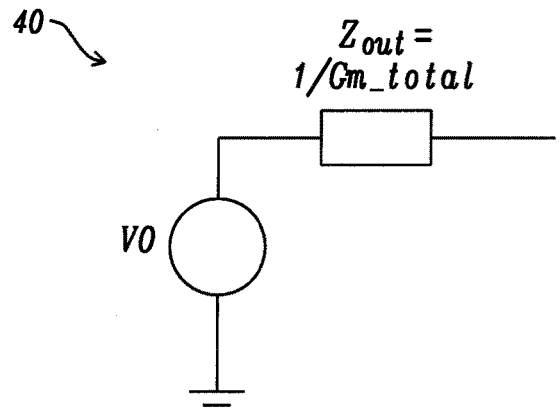
FIG. 5 shows an equivalent circuit diagram of an exemplary multiphase power converter.

In view of the forgoing, it becomes clear that the phases 1, 2, 3, 4 can also be seen as voltage controlled current sources VCCSs with a given transconductance Gm, which is given by Gmx, where x refers to a given phase 1, 2, 3, or 4. The transconductance in this context can be seen as the ratio of the output current to the input control voltage applied at the input of the respective phase. Moreover, the entire multiphase power converter 30 may be simplified in an equivalent circuit diagram 40 as a voltage source V0 in series with an electrical impedance Zout=1/Gm_total, as illustrated in FIG. 5

Figure 3:
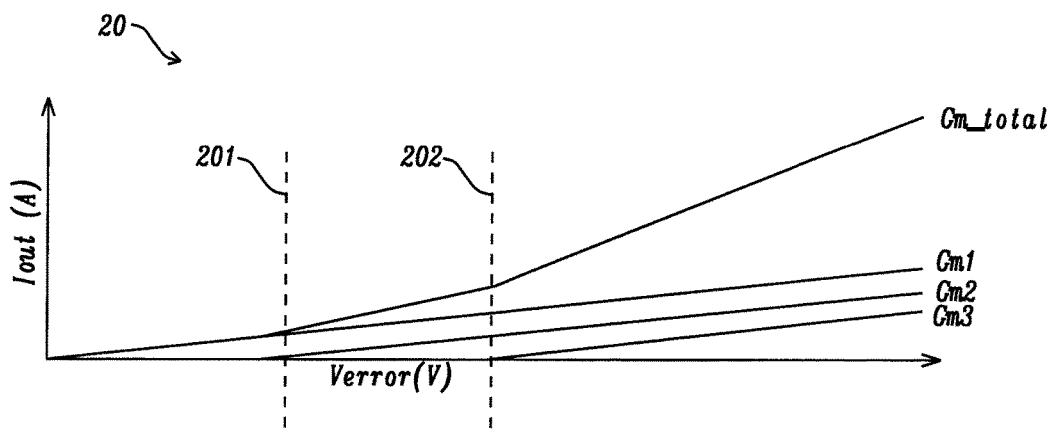
FIG. 3 shows a voltage-current diagram of an exemplary multiphase power converter.
Figure 4:
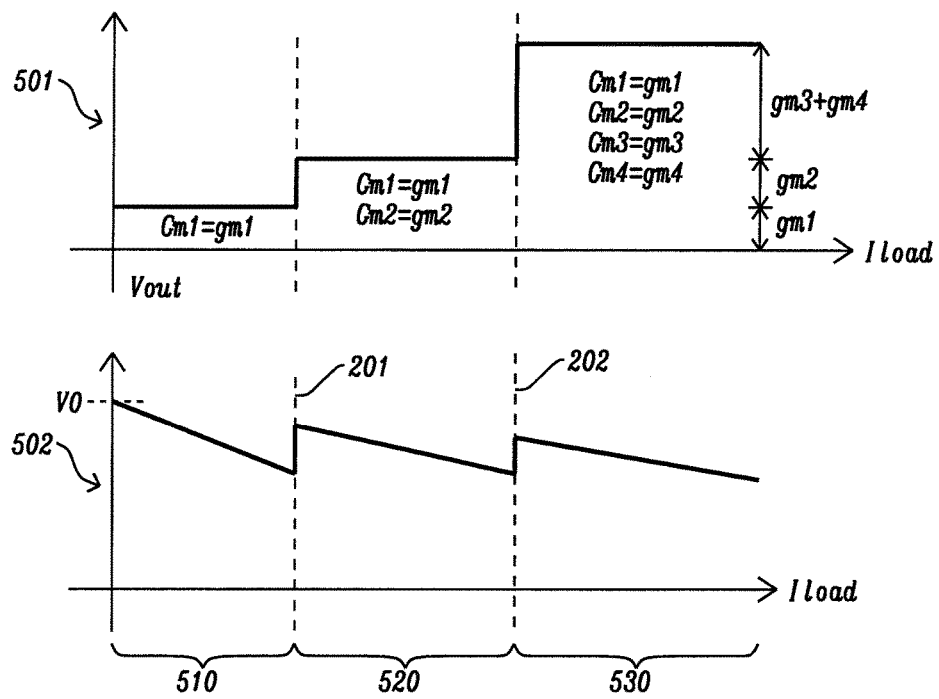
FIG. 4 shows a transconductance-current diagram and corresponding voltage-current diagram of an exemplary multiphase power converter.

FIGS. 3 and 4 illustrate how a multiphase power converter 10 is operated in a conventional fashion, i.e. without the switching network comprising switching units 301, 302, and 303. FIG. 3 shows a diagram 20 with the error voltage on the x-axis and the load current of a multiphase power converter on the y-axis. The error voltage denoted as Verror may e.g. depend on the relation between an internal reference voltage to the actual output voltage at the output 130 of the power converter. From time 0 to time 201, multiphase power converter 10 is operating in the first mode of operation and the overall transconductance Gm_total is equal to Gm1 since only the first phase 1 is active. From time 201 to time 202, when the second phase 2 is enabled, the overall transconductance Gm_total is equal to Gm1+Gm2, i.e. the slope of the current-voltage-curve is increasing. After time 202, when all phases 1, 2, 3, 4 are enabled in the third mode of operation, the overall transconductance Gm_total increases again and the slope is set to Gm1+Gm2+Gm3. The top diagram 501 in FIG. 4 illustrates the described behavior from a different perspective. The diagram shows the stepwise increase of the overall transconductance Gm_total when the load current Iload increases.

The drawback of this conventional control method becomes obvious when turning to the bottom diagram 502 of FIG. 4. Diagram 502 illustrates the output voltage Vout of the multiphase power converter 10 as a function of the load current Iload. Starting from voltage V0 at a load current Iload equal to 0, the output voltage Vout decreases as the load current Iload increases. At times 201, however, when switching from the first mode of operation in time interval 510 to the second mode of operation in time interval 520, the output voltage Vout suddenly jumps to an output voltage corresponding to the decreased overall impedance Zout. A similar jump of the output voltage Vout occurs at time 202 when switching from the third mode of operation in time interval 520 to the third mode of operation in time interval 530.

Figure 6:
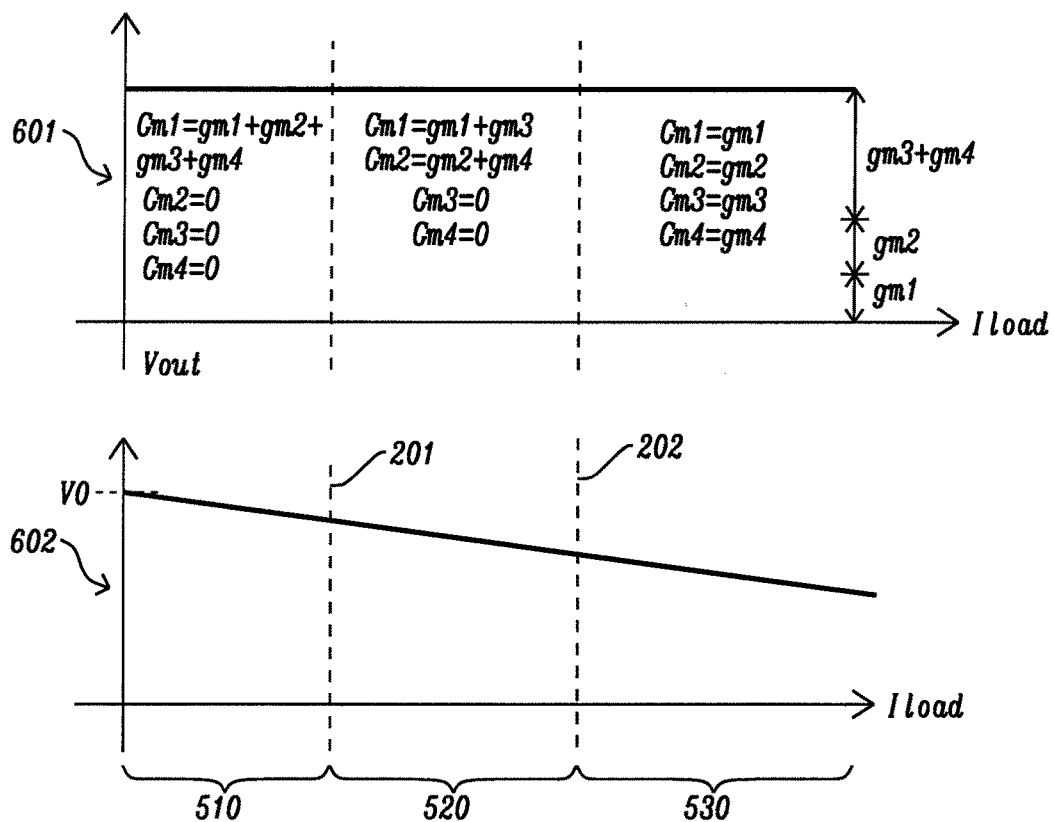
FIG. 6 shows another transconductance-current diagram and corresponding voltage-current diagram of an exemplary multiphase power converter.
Figure 7:
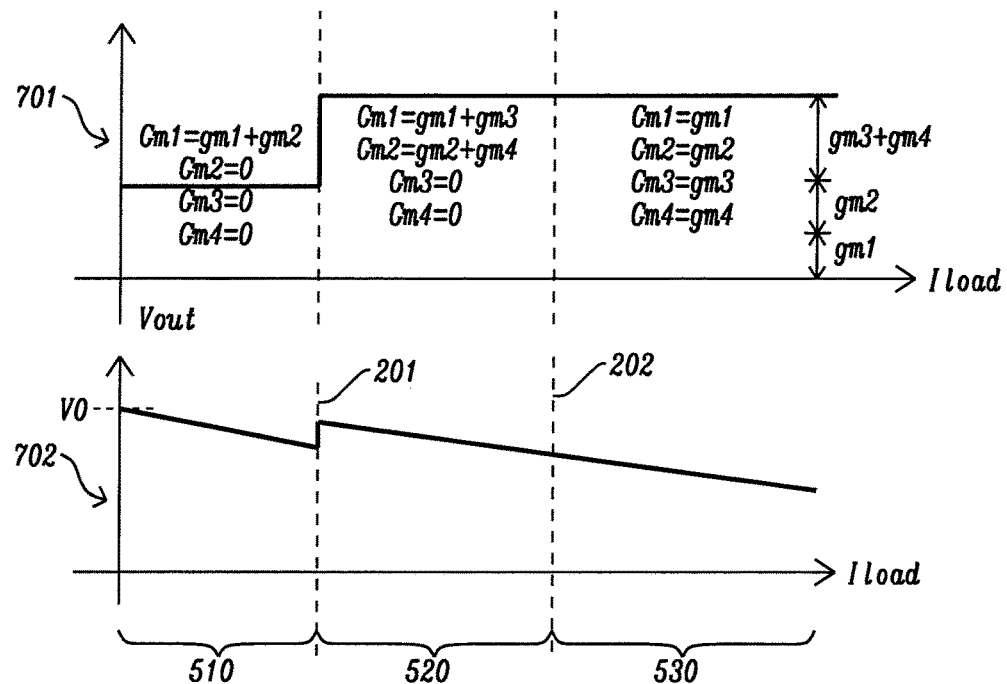
FIG. 7 shows yet another transconductance-current diagram and corresponding voltage-current diagram of an exemplary multiphase power converter.
Figure 8:
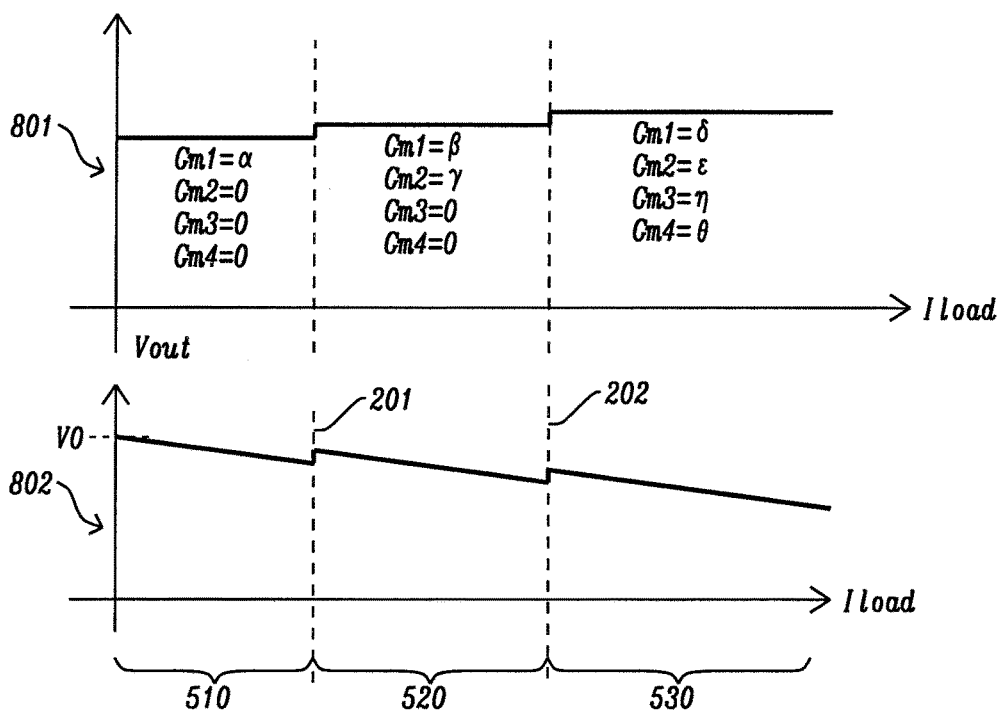
FIG. 8 shows yet another transconductance-current diagram and corresponding voltage-current diagram of an exemplary multiphase power converter.

FIGS. 6, 7, and 8 show diagrams in accordance with the ideas proposed in the present document. In FIG. 6, top diagram 601 illustrates how the overall transconductance Gm_total is kept constant during all time intervals 510, 520, 530, resulting in a smooth progression of the output voltage Vout which linearly decreases as the load current Iload increases (see bottom diagram 602). The diagrams 601 and 602 may be the result of applying the switching network as described in the context of FIG. 2.

Alternatively, FIG. 7 shows diagrams of the overall transconductance Gm_total (top diagram 701) and the output voltage V0 (bottom diagram 702) which may be obtained with an alternative activation of switching units 301, 302, and 303. In the illustrated example, the second switching unit 302 and the third switching unit 303 are not closed during the first mode of operation. As a consequence, only the output currents of the first VCCS 31 and the second VCCS 32 are summed up by switching unit 301 during time interval 510. In comparison to the output voltage Vout obtained by the conventional approach (see e.g. FIG. 4), the offset of Vout between time intervals 510 and 520 is significantly reduced.

Finally, FIG. 8 illustrates diagrams of the overall transconductance Gm_total (top diagram 801) and the output voltage Vout (bottom diagram 802) which may be obtained using a multiphase power converter in accordance with the principles proposed in the present document. By appropriate choice of parameters $\alpha$, $\beta$, $\gamma$, $\delta$, $\varepsilon$, $\eta$, and $\theta$, the overall transconductance Gm_total may be adjusted to smoothen the output voltage Vout when switching between the different modes of operation.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A multiphase power converter comprising a first and a second constituent switched-mode power converter, wherein
the first constituent switched-mode power converter is configured to provide, both in a first mode of operation and in a second mode of operation, a first phase current to an output of the multiphase power converter,
the second constituent switched-mode power converter is configured to provide, in the second mode of operation, a second phase current to the output of the multiphase power converter, and
the multiphase power converter is configured to switch, depending on an operation condition of the multiphase power converter, between the first mode of operation and the second mode of operation, and configured to adapt a first transconductance of the first constituent switched-mode power converter when switching between the first mode of operation and the second mode of operation.

2. The multiphase power converter according to claim 1, wherein the multiphase power converter is configured to increase the first transconductance when switching from the second mode of operation to the first mode of operation.

3. The multiphase power converter according to claim 1, wherein the multiphase power converter is configured to increase the first transconductance by an amount equal to a second transconductance of the second constituent switched-mode power converter.

4. The multiphase power converter according to claim 1, wherein the multiphase power converter is configured to adapt the first transconductance of the first constituent switched-mode power converter such that an overall transconductance of the multiphase power converter is approximately the same in the first mode of operation and in the second mode of operation, wherein the overall transconductance is determined by the sum of the first transconductance and a second transconductance of the second switched-mode power converter.

5. The multiphase power converter according to claim 1 comprising a first switching unit, wherein the first constituent switched-mode power converter comprises a first voltage controlled current source VCCS characterized by the first transconductance, the second constituent switched-mode power converter comprises a second VCCS characterized by the second transconductance, and the first switching unit is configured to couple, in the first mode of operation, a terminal of the first VCCS with a terminal of the second VCCS such that both an output current of the first VCCS and an output current of the second VCCS are provided to an inductor of the first constituent switched-mode power converter, and configured to decouple said terminals in the second mode of operation.

6. The multiphase power converter according to claim 5, wherein the first VCCS comprises a transconductance amplifier and/or the second VCCS comprises a transconductance amplifier.

7. The multiphase power converter according to claim 1, wherein the operation condition depends on a load current at the output of the multiphase power converter.

8. The multiphase power converter according to claim 1, wherein the multiphase power converter is configured to switch to the second mode of operation when a load current at the output of the multiphase power converter exceeds a first current threshold, and configured to switch to the first mode of operation when the load current falls below a second current threshold.

9. The multiphase power converter according to claim 5 comprising a second switching unit, a third switching unit, a third constituent switched-mode power converter comprising a third VCCS characterized by a third transconductance, and configured to provide, in a third mode of operation only, a third phase current to the output of the multiphase power converter, and a fourth constituent switched-mode power converter comprising a fourth VCCS characterized by a fourth transconductance, and configured to provide, in the third mode of operation only, a fourth phase current to the output of the multiphase power converter, wherein the first constituent switched-mode power converter is configured to provide, in the first, the second and the third mode of operation, the first phase current to the output of the multiphase power converter, the second constituent switched-mode power converter is configured to provide, in the second and the third mode of operation only, the second phase current to the output of the multiphase power converter, the multiphase power converter is configured to switch, depending on the operation condition of the multiphase power converter, between the first, the second and the third mode of operation, the first switching unit is configured to decouple the terminals of the first and the second VCCS in the third mode of operation, the second switching unit is configured to couple, in the first and second mode of operation, the terminal of the first VCCS with a terminal of the third VCCS such that both the output current of the first VCCS and an output current of the third VCCS are provided to the inductor of the first constituent switched-mode power converter, and configured to decouple said terminals in the third mode of operation, and the third switching unit is configured to couple, in the first and second mode of operation, the terminal of the second VCCS with a terminal of the fourth VCCS such that, in the first mode of operation, both the output current of the second VCCS and an output current of the fourth VCCS are provided to the inductor of the first constituent switched-mode power converter, and in the second mode of operation, both the output current of the second VCCS and the output current of the fourth VCCS are provided to the inductor of the second constituent switched-mode power converter, and configured to decouple said terminals in the third mode of operation.

10. The multiphase power converter according to claim 1, wherein at least one of the constituent switched-mode power converters is a buck converter, a boost converter or a buck-boost converter.

11. A method for operating a multiphase power converter comprising a first and a second constituent switched-mode power converter, the method comprising providing, both in a first mode of operation and in a second mode of operation, a first phase current of the first constituent switched-mode power converter to an output of the multiphase power converter, providing, in the second mode of operation only, a second phase current of the second constituent switched-mode power converter to the output of the multiphase power converter, switching, depending on an operation condition of the multiphase power converter, between the first mode of operation and the second mode of operation, and adapting a first transconductance of the first constituent switched-mode power converter when switching between the first mode of operation and the second mode of operation.

12. The method according to claim 11, wherein the adapting further comprises increasing the first transconductance when switching from the second mode of operation to the first mode of operation.

13. The method according to claim 11, wherein the adapting further comprises increasing the first transconductance by an amount equal to a second transconductance of the second constituent switched-mode power converter.

14. The method according to claim 11, wherein the first constituent switched-mode power converter comprises a first voltage controlled current source VCCS characterized by the first transconductance, the second constituent switched-mode power converter comprises a second VCCS characterized by the second transconductance, and the step of adapting further comprises connecting, in the first mode of operation, a terminal of the first VCCS with a terminal of the second VCCS such that both a current of the first VCCS and a current of the second VCCS are provided to an inductor of the first constituent switched-mode power converter, and disconnecting said terminals in the second mode of operation.

15. The method according to claim 11, wherein the multiphase power converter adapts the first transconductance of the first constituent switched-mode power converter such that an overall transconductance of the multiphase power converter is approximately the same in the first mode of operation and in the second mode of operation, wherein the overall transconductance is determined by the sum of the first transconductance and a second transconductance of the second switched-mode power converter.

16. The method according to claim 14, wherein the first VCCS comprises a transconductance amplifier and/or the second VCCS comprises a transconductance amplifier.

17. The method according to claim 11, wherein the operation condition depends on a load current at the output of the multiphase power converter.

18. The method according to claim 11, wherein the multiphase power converter switches to the second mode of operation when a load current at the output of the multiphase power converter exceeds a first current threshold, and configured to switch to the first mode of operation when the load current falls below a second current threshold.

19. The method according to claim 11, wherein at least one of the constituent switched-mode power converters is a buck converter, a boost converter or a buck-boost converter.

* * * * *